United States Patent
Fasold et al.

(10) Patent No.: US 9,954,236 B2
(45) Date of Patent: Apr. 24, 2018

(54) HUMIDIFIER, FOR EXAMPLE FOR A FUEL CELL

(71) Applicant: MANN+HUMMEL GMBH, Ludwigsburg (DE)

(72) Inventors: Michael Fasold, Auenwald (DE); Bernd Tippmer, Ludwigsburg (DE); Michael Harenbrock, Ludwigsburg (DE); Heinz Fuchs, Benningen (DE); Sascha Bauer, Auenwald (DE); Joerg Menssen, Markgroeningen (DE); Thomas Tschech, Marbach (DE); Steffen Schuetz, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 14/749,953

(22) Filed: Jun. 25, 2015

(65) Prior Publication Data
US 2015/0380750 A1    Dec. 31, 2015

(30) Foreign Application Priority Data

Jun. 27, 2014 (DE) .................. 10 2014 009 326

(51) Int. Cl.
*H01M 8/04119* (2016.01)

(52) U.S. Cl.
CPC .................. *H01M 8/04149* (2013.01)

(58) Field of Classification Search
CPC .................................. H01M 8/0419
See application file for complete search history.

(56) References Cited

U.S. PATENT DOCUMENTS

| | | | |
|---|---|---|---|
| 5,176,966 A * | 1/1993 | Epp | H01M 8/0271 429/437 |
| 8,091,868 B2 | 1/2012 | Robb et al. | |
| 2005/0191530 A1 | 9/2005 | Mossman | |
| 2010/0297514 A1* | 11/2010 | Jufuku | B60K 13/04 429/428 |
| 2012/0181712 A1 | 7/2012 | Vanderwees et al. | |
| 2012/0282533 A1* | 11/2012 | Kim | H01M 8/04149 429/413 |
| 2015/0014232 A1 | 1/2015 | McGinnis et al. | |
| 2015/0171442 A1 | 6/2015 | Fasold et al. | |
| 2015/0171445 A1 | 6/2015 | Fasold et al. | |

* cited by examiner

*Primary Examiner* — Helen O Conley
(74) *Attorney, Agent, or Firm* — James Hasselbeck

(57) ABSTRACT

A humidifier has a stack unit having a plurality of water-vapor-permeable membranes which are arranged parallel one above the other and spaced apart from one another. Two adjacent membranes are connected to one another via fixing elements, wherein a first fixing element acts on the top membrane from above and a second fixing element acts on the bottom membrane from below.

7 Claims, 3 Drawing Sheets

HUMIDIFIER, FOR EXAMPLE FOR A FUEL CELL

TECHNICAL FIELD

The invention relates to a humidifier, for example for a fuel cell, according to the preamble of claim 1.

BACKGROUND

Humidifiers for fuel cells are known, for example, from DE 10 2009 034 095 A1 or EP 1 261 992 B1, which include a plurality of water-vapor-permeable membranes which separate flow channels through which moist or dry air is guided. Water molecules penetrate through the membrane from the moist to the dry air flow, which thereby is enriched with moisture. The moistened air flow is fed to a fuel cell system in which electricity is generated as a result of an electrochemical reaction.

In DE 10 2009 034 095 A1, a plurality of membranes arranged one above the other and spaced apart from one another are combined to a form a stack, wherein the membranes, in their edge region, are connected to frame parts, and a sealing element for a flow-tight closure is arranged between the frame parts of adjacent membranes. The dry or moist air flows crosswise through flow channels which are arranged one above the other and between which in each case one membrane is placed. The frame parts and the sealing elements therebetween also serve as spacers in order to fix the membranes, which are clamped in parallel, spaced apart from one another.

SUMMARY OF THE INVENTION

It is an object of the invention to design with simple measures a humidifier having a plurality of membranes stacked one above the other in such a manner that the position of the membranes is securely fixed in the stack.

By means of the humidifier according to the invention, the flowing air which, for example, is fed to a fuel cell for the electrochemical reaction, can be enriched with moisture until a required minimum moisture content in the air flow is reached. This makes it possible, for example, to use the humidifier for fuel cells in which electricity is generated by means of an electrochemical reaction. Also, possible fields of use of the humidifier are moistening respiratory air in closed rooms, for example as an aircraft humidifier for moistening respiratory air in aircraft cabins.

The humidifier has at least one stack unit comprising a plurality of water-vapor-permeable membranes arranged one above the other, which are arranged parallel to one another and spaced apart from one another. The stack unit comprises at least two membranes, wherein a significantly higher number of membranes can be provided, if necessary.

Two adjacent membranes are connected to one another via fixing elements which act on the membranes from different sides. A first fixing element pushes the top membrane from top downwards and a second fixing element pushes the bottom membrane from bottom upwards. The at least two interacting fixing elements change the distance between the membranes in the region of the fixing elements.

The fixing elements can principally be arranged at any positions between the membranes. Fixing is possible in the edge region of the membrane and/or in a central region which is spaced apart from the membrane edge. Fixing is carried out either at one place only between the membranes, for example in a central region spaced apart from the edge, or at a plurality of places in the central region and/or in the edge region.

The membranes are advantageously the same size and are arranged directly one above the other. The relative position of the membranes to one another is fixed via the connection by means of the fixing elements. Another advantage is that due to the level change in the position of the membrane in the region of the fixing element, the membrane tension is increased, whereby a defined relative distance between the membranes is ensured under different conditions. In particular in the case of membranes having a large surface area, the increase in tension effects that even in the event of a negative pressure on one side of the membrane, no undesirable contact with the adjacent membrane takes place.

According to an advantageous embodiment, the membranes are placed directly on top of one another in the region of the fixing elements. Moreover, embodiments in which the membranes are spaced apart from one another are also possible, wherein the distance differs from the regular distance of the membranes outside of the fixing elements. In the region of the fixing elements, the distance can be greater or less than the regular distance between the membranes outside of the fixing elements. However, the distance between the membranes is advantageously reduced.

According to another advantageous embodiment, the fixing elements for fixing membranes placed one above the other are formed to be complementary to one another, wherein one fixing element has a projection and a second fixing element has a recess, and in the mounted state, the projection of the one fixing element engages in the recess in the other fixing element. In the plane of the membranes, a form-locking connection is implemented via the fixing elements, and in the direction orthogonal to the membrane, the fixing elements are connected to one another in a friction- or force-locking manner.

It is also possible to connect the fixing elements by adhesive bonding or welding, for example by means of friction welding.

According to yet another advantageous embodiment, two interacting fixing elements are formed identically and each of them has a projection on one front side and a recess on the opposite front side. This embodiment has the advantage that due to the identical design of the fixing elements, the number of parts for producing the humidifier is reduced. In addition, in the case of a stack comprising a plurality of membranes lying one above the other, the fixing elements can also be stacked on top of one another and inserted into one another.

As a result of the fixation with the fixing elements, both membranes that are acted on by two fixing elements are advantageously offset with respect to the respective membrane plane. According to another advantageous embodiment, the measure by which the membranes are offset can be at least as great as the regular distance between the membranes outside of the fixing elements.

According to another advantageous embodiment it is provided that the fixing elements are formed hollow-cylindrically. On the one hand, this reduces weight. On the other hand, this enables inserting a stabilizing element, preferably a stabilizing rod, for example a metal rod, through at least fixing elements placed on top of one another, which hereby are provided with additional stability. It can be advantageous to feed a common stabilizing rod through all fixing elements placed on top of one another.

According to yet another advantageous embodiment, spacers are provided between the membranes, which keep membranes outside the fixing elements at a target distance.

The spacers ensure that in particular in the flow chambers between membranes under negative pressure, the membranes do not lie on top of one another in an undesirable manner and thereby reduce the cross-section of the flow chamber. Considered can be embodiments in which the spacers and the fixing elements are configured as separate components as well as embodiments in which spacers and fixing elements are formed as one piece. Here, a fixing element is preferably formed as one piece with at least one spacer, optionally with two or more spacers, or is connected to one or a plurality of spacers.

BRIEF DESCRIPTION OF THE DRAWINGS

Further advantages and expedient embodiments can be found in the further claims, the description of the figures and the drawings. In the figures:

In the figures, the same components are designated by the same reference signs.

DETAILED DESCRIPTION OF PREFERRED EMBODIMENTS

Figure 1:
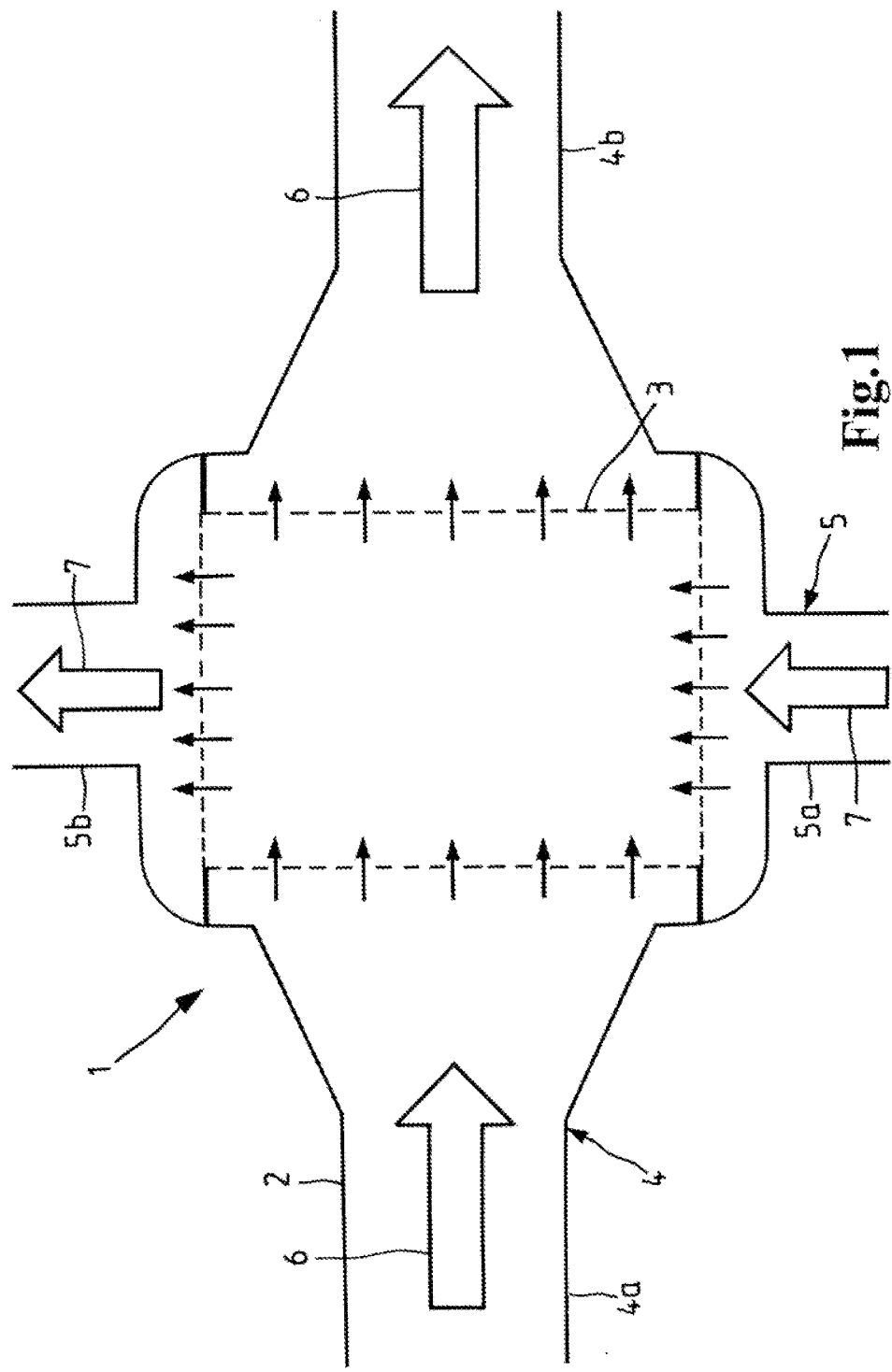
FIG. 1 shows a humidifier for a fuel cell having a cartridge inserted into a housing, the cartridge containing a plurality of water-vapor-permeable membranes which are arranged parallel to one another and form a stack unit.

In FIG. 1, a humidifier 1 for a fuel cell is illustrated, via which fresh air enriched with moisture and having a minimum moisture level is fed to the fuel cell. In a housing 2, the humidifier 1 has a cartridge 3 which is inserted into the housing in a replaceable manner, and which serves for transmitting the moisture contained in an exhaust gas flow to a dry fresh air flow, which is fed to the fuel cell. The cartridge 3 has a stack unit comprising a plurality of water-vapor-permeable membranes stacked one above the other.

The housing 2 of the humidifier 1 is provided with a fresh air channel 4 via which ambient air is supplied as fresh air. The fresh air channel 4 comprises a feeding section 4a upstream of the cartridge 3 and a discharging section 4b downstream of the cartridge.

The housing 2 is provided with an exhaust gas channel 5 which is offset at an angle of 90° relative to the fresh air channel 4 and via which exhaust gases of the fuel cell, which are enriched with moisture, are guided through the cartridge. The exhaust gas channel 5 has a feeding section 5a upstream of the cartridge 3 and a discharging section 5b downstream of the cartridge.

The fresh air flow 6 and the exhaust gas flow 7 intersect according to the orientation of the channels 4 and 5 at an angle of 90°; however, the air flows 6 and 7 within the cartridge 3 are separated by the water-vapor-permeable membranes, which only permit water exchange from the exhaust gas flow 7 laden with a high level of moisture to the dry fresh air flow 6.

Figure 2:
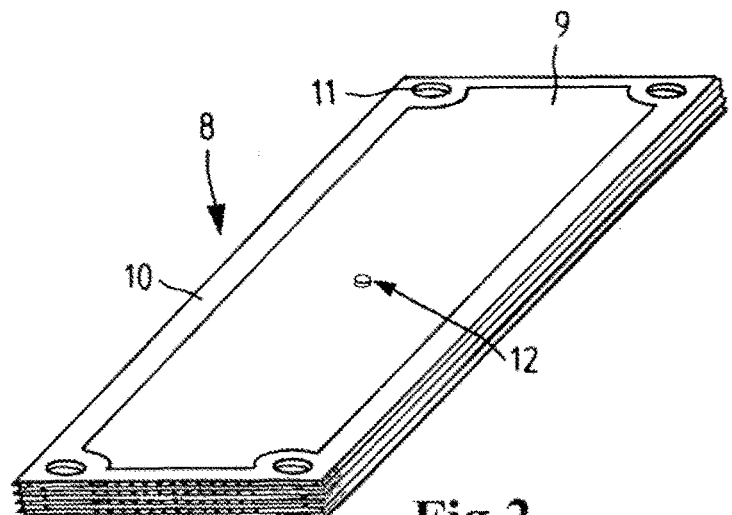
FIG. 2 shows a perspective view of a stack unit comprising a plurality of membranes placed one above the other.

FIG. 2 illustrates a stack unit 8 of the humidifier comprising a plurality of membranes 9 lying parallel and arranged one above the other. Each of the membranes 9 is enclosed by a frame 10 via which the membranes 9 are kept spaced apart from one another. Sealing elements can be provided in each case on two opposing front sides on the frame 10 in order to enable a distinct flow through the channels or flow chambers between adjacent membranes 9 either in the longitudinal or in the transverse direction. Each of the membranes 9 is formed rectangularly. The inflow into the stack unit 8 takes place in a crosswise manner so that in flow chambers placed one above the other between adjacent membranes 9, the flow therethrough flows alternately through a front side and through a transverse side.

In each corner region of the membranes 9, recesses 11 are provided in the frame 10 through which rods can be fed to fix the stack.

A fixing device 12 comprising a plurality of fixing elements (see FIGS. 3, 4) stacked one above the other, via which the membranes 9 can be additionally fixed, is provided approximately in the center of the stack unit 8.

Figure 3:
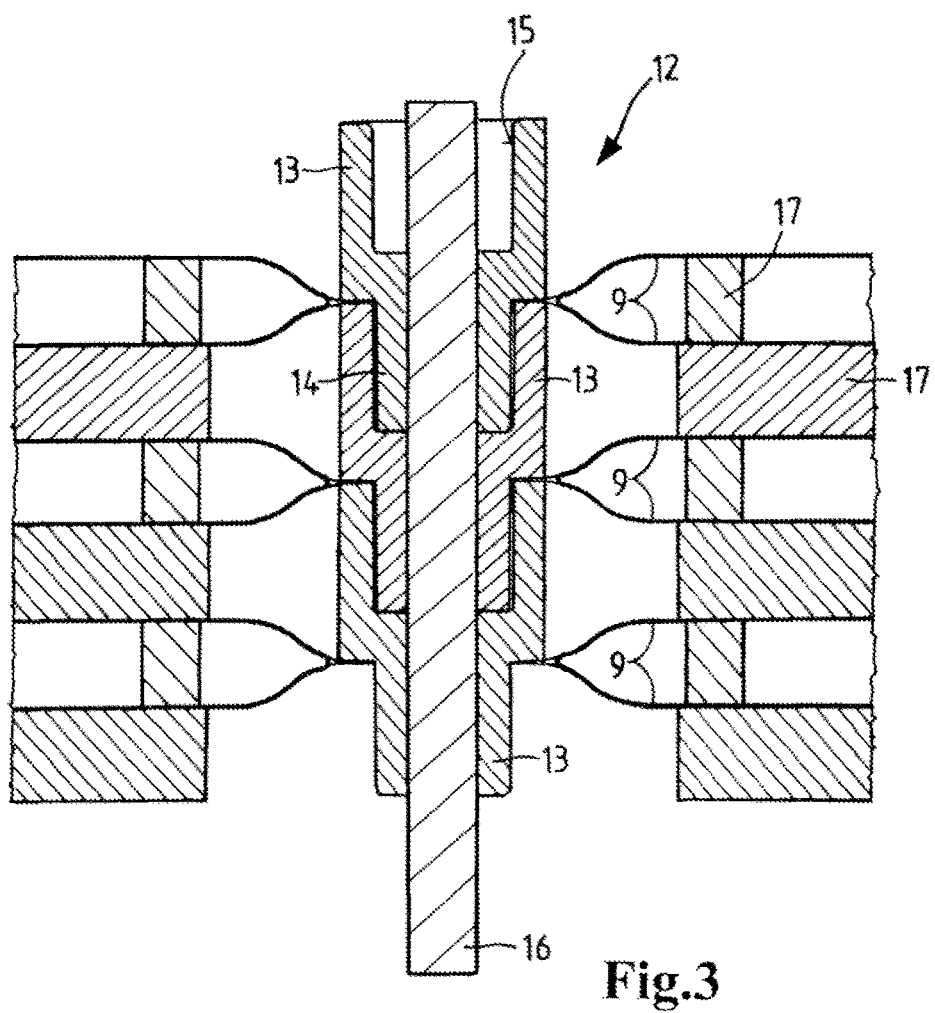
FIG. 3 shows a section through a stack unit in the region of fixing elements which are inserted for fixing the membranes.
Figure 5:
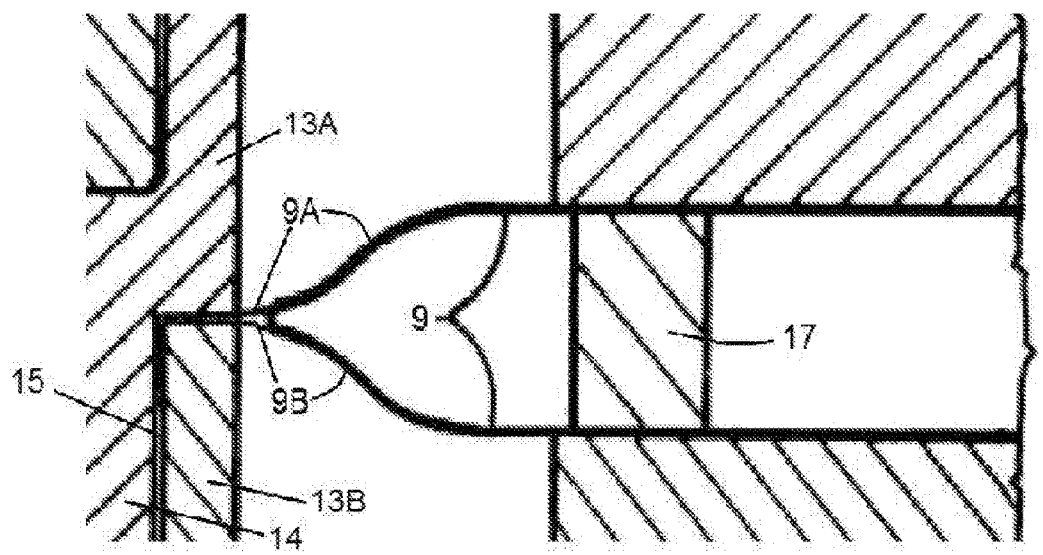
FIG. 5 shows an enlargement of two adjacent fixing elements of FIGS. 3 and 4, clamping two adjacent membranes together between the adjacent fixing elements.
Figure 4:
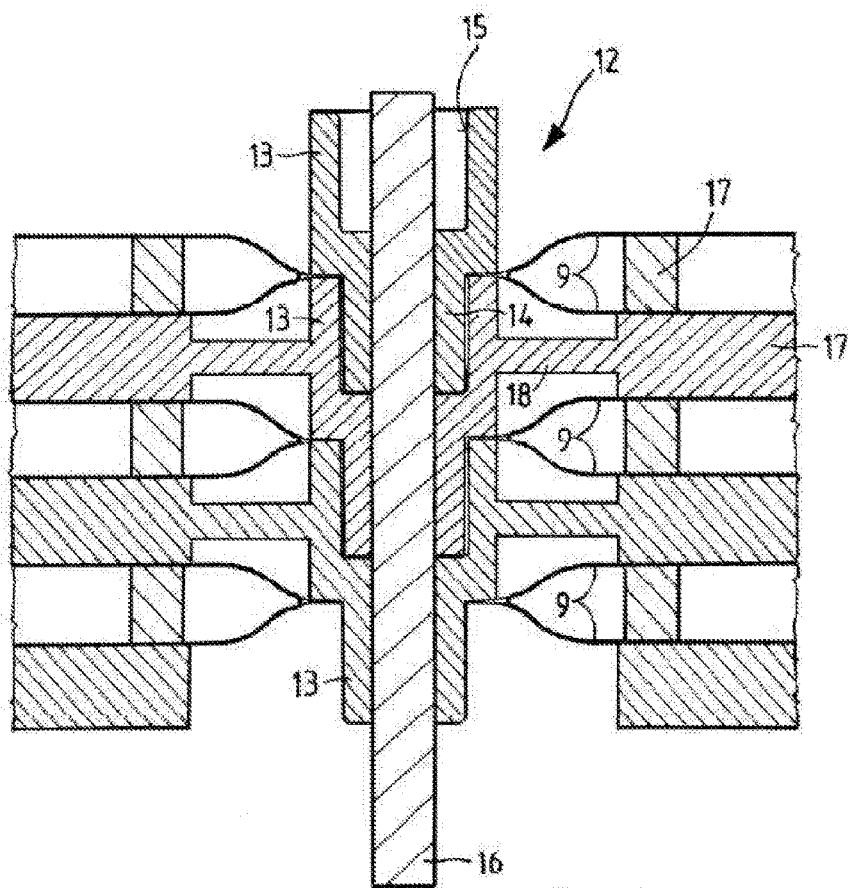
FIG. 4 shows an illustration corresponding to FIG. 3, but in an embodiment variant of the fixing elements which are formed integrally with spacers between the membranes.

According to FIGS. 3 and 5, the fixing device 12 comprises a plurality of fixing elements 13 which are stacked one above the other and each of which is structured identically and has a projection 14 on the one end and a complementary recess 15 on the other end. This makes it possible to insert the fixing elements 13 into one another so that in each case a projection 14 of a first fixing element protrudes into the recess 15 of a second fixing element. In each case two membranes 9 are clamped in place between the fixing elements. Referring to the enlarged view of FIG. 5, a first fixing element 13A has a projection 14. The first fixing element 13A acts on a top membrane 9A from above and a second fixing element 13B having a recess 15 acts on an adjacent bottom membrane 9B from below such that the top membrane 9A is clamped against, directly contacts against and lies directly on the bottom membrane 9B in a membrane region positioned between the first fixing element 13A and the second fixing element 13B.

Fixing the membranes 9 is carried out in such a manner that in the region of the fixing elements 13, the membranes lie outside of the fixing elements and are offset with respect to their membrane plane. The two membranes which are in each case connected in the region of the fixing elements 13 are directly adjoining one another in the fixing elements and adapt to the outer contour of the projection 14 and to the inner contour of the recess 15, respectively. The offset by which the membranes 9 in the region of the projection 14 or the recess 15 of the fixing elements 13 are offset with respect to their membrane plane outside of the fixing elements exceeds the distance of the membranes outside of the fixing elements.

Each of the fixing elements 13 is formed hollow-cylindrically and has a central recess or hole, wherein a continuous hole is formed in the assembled state of the fixing elements 13. In this hole, a stabilizing rod 16 is inserted, which results in additional stabilization. The stabilizing rod 16 is made of metal, for example. Optionally, the stabilizing rod 16 can also be omitted. Furthermore, it is possible to form the fixing elements 13 not hollow-cylindrically, but as a solid block.

In the orthogonal direction to the membrane plane, the fixing elements 13 are held together either in a friction- or force-locking manner or, according to another embodiment, are connected to one another by adhesive bonding or welding, for example friction welding. The fixing elements 13 are advantageously composed of plastics. However, the fixing elements cam also be made of metal.

Spacers 17 providing for a defined distance between the membranes 9 and preventing adjacent membranes from unintentional and undesirable abutting are arranged between the membranes 9 outside of the fixing elements 13. In the exemplary embodiment according to FIG. 3, the spacers 17 are implemented separately from the fixing elements 13. However, in the exemplary embodiment according to FIG. 4, there is a connecting bridge 18 between the fixing elements 13 and the spacers 17 so that the fixing elements 13 and the spacers 17 are formed as one piece. A plurality of bridges 18 for connecting to adjacent spacers 17 can be arranged on a fixing element 13. The connection between the fixing elements 13 and the spacers 17 via bridges 18 is only implemented in every second plane in which in each case two membranes 9 placed directly one above the other are fixed to one another via the fixing elements 13, so that the possibility of a one-piece design of the fixing elements 13 and the spacers 17 via the bridges 18 is given only in the space between in each case two membranes that are fixed together.

What is claimed is:

1. A humidifier, comprising:
   at least one stack unit including
      a plurality of membranes permeable to water vapor;
      wherein the membranes are arranged parallel one above the other and spaced apart from one another;
   wherein adjacent two membranes of the plurality of membranes are connected to one another via fixing elements;
   wherein the fixing elements are stacked one on top of another to connect and space apart the plurality of membranes;
   wherein the fixing elements are formed to be complementary, and when in a mounted state, a projection of a first fixing element of the fixing elements engages into an associated recess of an adjacent second fixing element,
   wherein the first fixing element acts on a top membrane from above and the second fixing element acts on an adjacent bottom membrane from below such that the top membrane is clamped against, directly contacts against and lies directly on the bottom membrane in a membrane region positioned between the first fixing element and the second fixing element.

2. The humidifier according to claim 1, wherein
   the first and second fixing elements are formed identically;
   wherein each fixing element has a projection on one front side and a recess on an opposing front side.

3. The humidifier according to claim 1, wherein
   the fixing elements are formed hollow-cylindrically.

4. The humidifier according to claim 3, wherein
   a stabilizing element extends through at least two fixing elements placed on top of one another.

5. The humidifier according to claim 1, wherein
   the fixing elements are connected with spacers which are arranged between the membranes.

6. A fuel cell comprising
   a humidifier including
      at least one stack unit including
         a plurality of membranes permeable to water vapor;
         wherein the membranes are arranged parallel one above the other and spaced apart from one another;
      wherein adjacent two membranes of the plurality of membranes are connected to one another via fixing elements;
      wherein the fixing elements are stacked one on top of another to connect and space apart the plurality of membranes;
      wherein the fixing elements are formed to be complementary, and when in a mounted state, a projection of a first fixing element of the fixing elements engages into an associated recess of an adjacent second fixing element,
      wherein the first fixing element acts on a top membrane from above and the second fixing element acts on an adjacent bottom membrane from below such that the top membrane is clamped against, directly contacts against and lies directly on the bottom membrane in a membrane region positioned between the first fixing element and the second fixing element.

7. The humidifier according to claim 1, wherein
   the humidifier is an aircraft humidifier.

* * * * *